(12) United States Patent
Pinto et al.

(10) Patent No.: US 6,548,568 B1
(45) Date of Patent: Apr. 15, 2003

(54) RADIATION-CURABLE RELEASE COMPOSITIONS, USE THEREOF AND RELEASE COATED SUBSTRATES

(75) Inventors: Olivier Pinto, Les Gambys (FR); Stuart Kerr, III, Rock Hill, SC (US); Basil A. Behnam, Oakville (CA)

(73) Assignee: Rhodia Inc., Cranbury, NJ (US)

( * ) Notice: Subject to any disclaimer, the term of this patent is extended or adjusted under 35 U.S.C. 154(b) by 0 days.

(21) Appl. No.: 09/546,791

(22) Filed: Apr. 11, 2000

(51) Int. Cl.$^7$ .................................................. C08F 2/48
(52) U.S. Cl. .................. 522/99; 522/148; 522/172; 522/109; 522/11; 525/103; 525/477; 427/207.1; 427/508; 427/515; 427/516; 428/447; 428/448; 428/449; 528/10; 528/31; 528/32; 528/33; 528/41
(58) Field of Search .................. 528/32, 31, 33, 528/41, 10; 525/103, 477; 522/99, 148, 172, 109, 111; 427/207.1, 508, 515, 516; 428/447, 448, 449

(56) References Cited

U.S. PATENT DOCUMENTS

| | | | |
|---|---|---|---|
| 4,201,808 A | 5/1980 | Cully et al. | 428/40 |
| 4,293,678 A | * 10/1981 | Carter et al. | 528/32 |
| 4,568,566 A | 2/1986 | Tolentino | 427/54 |
| 4,678,846 A | 7/1987 | Weitemeyer et al. | 525/477 |
| 5,494,979 A | 2/1996 | Ebbrecht et al. | 525/479 |
| 5,510,190 A | * 4/1996 | Allen et al. | 428/448 |
| 5,552,506 A | 9/1996 | Ebbrecht et al. | 528/15 |
| 5,654,093 A | 8/1997 | Kidon et al. | 428/352 |
| 5,804,301 A | 9/1998 | Curatolo | 428/352 |
| 5,891,530 A | 4/1999 | Wright | 427/515 |
| 5,977,282 A | 11/1999 | Ebbrecht et al. | 528/29 |
| 6,268,404 B1 | 7/2001 | Döhler et al. | 522/99 |

FOREIGN PATENT DOCUMENTS

| | | |
|---|---|---|
| DE | 198 36 246 | * 2/2000 |
| EP | 0 449 027 | 10/1991 |
| EP | 1 076 081 | 2/2001 |
| WO | WO 95/23694 | 9/1995 |
| WO | WO 01/77240 | 10/2001 |

OTHER PUBLICATIONS

Search Report dated Oct. 19, 2001, in corresponding to PCT/US01/11268.

* cited by examiner

Primary Examiner—James J. Seidleck
Assistant Examiner—Sanza L. McClendon
(74) Attorney, Agent, or Firm—John A. Shedden

(57) ABSTRACT

A radiation-curable release composition comprises:

(a) from about 50 to about 100 parts by weight of an organopolysiloxane of the formula (I)

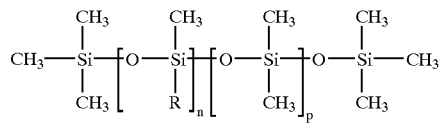

wherein R is $CH_2=CH-C(O)-O-CH_2-CH(OH)-CH_2-O-CH_2-CH_2-CH_2-$, n is 5 to 15, and p is 50 to 150;

(b) from 0 to about 50 parts by weight of one or more organopolysiloxanes comprising organopolysiloxanes selected from the group consisting of those of formulae (II) and (III)

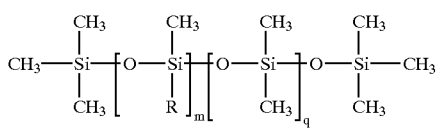

wherein R is $CH_2=CH-C(O)-O-CH_2-CH(OH)-CH_2-O-CH_2-CH_2-CH_2-$, m is 1 to 10, and q is 151 to 300; and

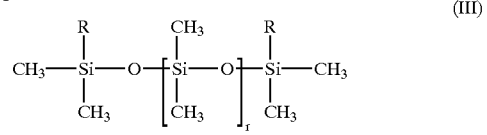

wherein R is $CH_2=CH-C(O)-O-CH_2-CH(OH)-CH_2-O-CH_2-CH_2-CH_2-$, and r is 20 to 500;

(c) from 0 to about 10 parts by weight of an organopolysiloxane of formula (IV)

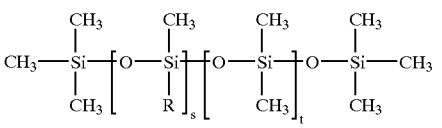

wherein R is $CH_2=CH-C(O)-O-CH_2-CH(OH)-CH_2-O-CH_2-CH_2-CH_2-$, s is 1 to 10, and t is 301 to 1000;

(d) from 0 to about 10 parts by weight of at least one additive for modifying the adhesion and flexibility properties of the composition, the at least one additive selected from the group consisting of acrylate and vinyl ether monomers; and (e) from 0 to about 10 parts by weight of a photoinitiator.

For easier release, at least one of component (b) or (c) is preferably present in the composition.

25 Claims, No Drawings

RADIATION-CURABLE RELEASE COMPOSITIONS, USE THEREOF AND RELEASE COATED SUBSTRATES

FIELD OF THE INVENTION

This invention relates to radiation-curable organopolysiloxane-containing release coating compositions, the use of such release coating compositions to coat a substrate, and release coated substrates thereof.

BACKGROUND OF THE INVENTION

Radiation-curable silicone coatings for release of pressure-sensitive adhesives are well known. In the 1980's, two radiation-curable silicone release systems appeared on the market. One system was a radiation-curable acrylate-silicone copolymer system curable by a free-radical mechanism under both ultraviolet and electron beam radiation. Such systems are disclosed, for example, in U.S. Pat. Nos. 4,201,808; 4,568,566; 4,678,846; 5,494,979; 5,510,190; 5,552,506; 5,804,301; 5,891,530; and 5,977,282.

The other system was an ultraviolet curable system curing by a cationic mechanism and based on epoxy silicone polymers. Epoxy silicone polymer systems are disclosed, for example, in U.S. Pat. Nos. 4,421,904; 4,547,431; 4,952,657; 5,217,805; 5,279,860; 5,310,601; 5,340,898; 5,360,833; 5,650,453; 5,866,261; and 5,973,020.

Each of these release coating systems exhibits a specific range of release properties, some developed for specific needs or applications. However, there are other applications or uses where the specific release properties of these prior art systems are not ideal. There is, therefore, a need to provide a radiation-curable release system that can easily vary the range of properties of the release compositions, such as to raise or lower the release force and to extend the release performance of the system. There is also a need for such radiation-curable release systems that provide better anchorage of the release coating on a film or liner substrate and which provides better fluid coating rheology. A further need is to provide a radiation-curable release composition that exhibits improved polymer compatibility.

SUMMARY OF THE INVENTION

One or more objects of this invention is obtained by a radiation-curable release composition comprising:

(a) from about 50 to about 100 parts by weight of an organopolysiloxane of the formula (I)

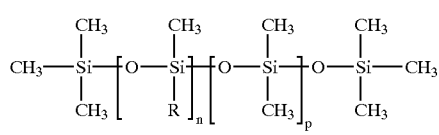

wherein R is $CH_2=CH-C(O)-O-CH_2-CH(OH)-CH_2-O-CH_2-CH_2-CH_2-$, n is 5 to 15, and p is 50 to 150;

(b) from 0 to about 50 parts by weight of one or more organopolysiloxanes comprising organopolysiloxanes selected from the group consisting of those of formulae (II) and (III)

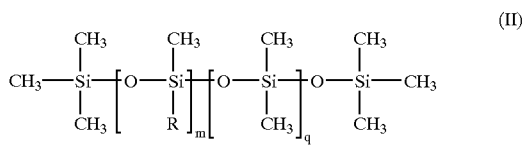

wherein R is $CH_2=CH-C(O)-O-CH_2-CH(OH)-CH_2-O-CH_2-CH_2-CH_2-$, m is 1 to 10, and q is 151 to 300; and

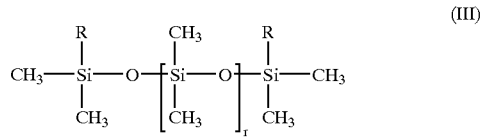

wherein R is $CH_2=CH-C(O)-O-CH_2-CH(OH)-CH_2-O-CH_2-CH_2-CH_2-$, and r is 20 to 500;

(c) from 0 to about 10 parts by weight of an organopolysiloxane of formula (IV)

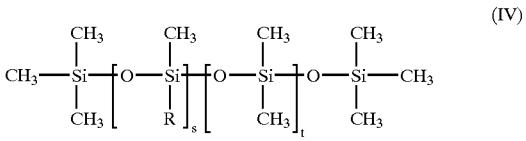

wherein R is $CH_2=CH-C(O)-O-CH_2-CH(OH)-CH_2-O-CH_2-CH_2-CH_2-$, s is 1 to 10, and t is 301 to 1000;

(d) from 0 to about 10 parts by weight of at least one additive for modifying the adhesion and flexibility properties of the composition, the at least one additive selected from the group consisting of acrylate and vinyl ether monomers; and (e) from 0 to about 10 parts by weight of a photoinitiator.

For easier release, at least one of component (b) or (c) is preferably present in the composition.

A further aspect of the invention comprises a method for producing a release coating on a substrate by applying the aforedescribed radiation-curable release composition to a substrate and curing the coating on the substrate by exposing the coating to radiation. A still further aspect of this invention comprises a release coated article comprising a substrate which has been coated with the radiation-curable release composition and has been cured by exposure to radiation.

DETAILED DESCRIPTION OF THE INVENTION AND PREFERRED EMBODIMENTS

The organopolysiloxane polymers of formulae (I) to (IV) of this invention can be prepared according to processes generally known in the art. For example, an organopolysiloxane polymer can be reacted with allyl glycidyl ether in a platinum catalyzed hydrosilation reaction to produce an epoxy functional organopolysiloxane, and the resulting epoxy functional organopolysiloxane is reacted with acrylic acid in the presence of a $Cr^{111}$ catalyst to produce the organopolysiloxane polymers of formulae (I) to (IV) of this invention.

While the radiation-curable release compositions containing the organopolysiloxane polymers of this invention may be utilized without component (d), in those occurrences where the organopolysiloxane polymers by themselves do not have sufficient inherent properties to strongly anchor or adhere onto a substrate or liner, especially on plastic films, such as polyesters, polyolefins and the like, an adhesion and flexibility modifying component (d) may be employed.

Any suitable acrylate monomer containing one or more functional acrylate groups may be employed as component (d). As examples of such suitable acrylate monomers, there may be mentioned the following: ethylhexyl acrylate, stearyl acrylate, tetrahydrofurfuryl acrylate, lauryl acrylate, isodecyl acrylate, 2(2-ethoxyethoxy)ethyl acrylate, cyclohexyl acrylate, isooctyl acrylate, tridecyl acrylate, isobornyl acrylate, caprolactone acrylate, alkoxylated phenol acrylates, 1,3-butylene glycol diacrylate, 1,4-butanediol diacrylate, diethylene glycol diacrylate, neopentyl glycol diacrylate, tetraethylene glycol diacrylate, triethylene glycol diacrylate, dipropylene glycol diacrylate, alkoxylated hexanediol diacrylates, trimethylolpropane triacrylate, ethoxylated trimethylolpropane triacrylate, propoxylated glycerol triacrylate, pentarythritol triacrylate, pentaerythritol tetraacrylate, di-trimethylolpropane tetraacrylate, and di-pentaerythritol pentaacrylate.

Preferred as additive (d) is a mixture of acrylic monomers, such as for example, a 60/40 weight blend of dipentaerythritol pentaacrylate and 1,6-hexanediol diacrylate.

Any suitable vinyl ethers can be included as component (d) in the radiation-curable release coating of the present invention, and these include ethers containing one or more vinyl groups. The vinyl ethers can copolymerize with the acrylates and provide low viscosity properties to the mixtures and flexibility to the cured coating compositions. Examples of suitable vinyl ethers include ethyl vinyl ether, butyl vinyl ether, hydroxy butyl vinyl ether, cyclohexyl vinyl ether, 2-ethylhexyl vinyl ether, octyl vinyl ether, decyl vinyl ether, dodecyl vinyl ether, octadecyl vinyl ether, cyclohexane dimethanol monovinyl ether, phenyl vinyl ether, 1,6-hexanediol divinyl ether, 1,4-cyclohexane dimethanol divinyl ether, diethylene glycol divinyl ether, triethylene glycol divinyl ether, tetraethylene glycol divinyl ether, dipropylene glycol divinyl ether, tripropylene glycol divinyl ether, tetrapropylene glycol divinyl ether, and the propenyl ether of propylene carbonate. Ethers with more than one vinyl group are preferred.

The radiation-curable release compositions of the present invention optionally may contain at least one photoinitiator, component (e). Generally no photoinitiator is required when the composition is to be cured under ionizing radiation, such as electron beam irradiation. However, when the curing is to be done by ultraviolet light, the amount of photoinitiator included in the compositions of the invention may range up to about 10%, more often up to about 5% by weight based on the total weight of the radiation-curable composition. A photoinitiator is incorporated into the curable compositions when compositions are to be cured by exposure to nonionizing radiation such as ultraviolet light.

Suitable photoinitiators include those compounds that produce free radicals which operate to polymerize and cure the compositions used in this invention. Examples of photoinitiators which may be used in combination with ultraviolet light include, for example, benzyl ketals, benzoin ethers, acetophenone derivatives, ketoxime ethers, benzophenone, benzo or thioxanthones, and the like. Specific examples of photoinitiators include: 2,2-diethoxyacetophenone, 2- or 3- or 4-bromoacetophenone, benzoin, benzophenone, 4-chlorobenzophenone, 4-phenylbenzophenone, benzoquinone, 1-chloroanthroquinone, p-diacetyl-benzene, 9,10-dibromoanthracene, 1,3-diphenyl-2-propanone, 1,4-naphthyl-phenyl ketone, 2,3-pentenedione, propiophenone, chlorothioxanthone, xanthone, fluorenone, and mixtures thereof. As examples of commercially available photoinitiators of this type, there can be mentioned the photoinitiators available from the Ciba Geigy Corporation of Hawthorne, N.Y. under the tradenames of Darocur® 1173 and Irgacure® 500 and the photoinitiators available from Sartomer Co. under the tradename Esacure KIP100F.

The radiation-curable release compositions of the present invention are produced by mixing the aforementioned components of the composition. The components may be mixed at room temperature with stirring. In some instances, it may be desirable to employ mild heating to facilitate mixing. However, the main silicone components are very compatible when blended into one another and generally do not require them to be maintained under continuous stirring and heat to keep the system homogeneous as is usual with prior art formulations.

The radiation-curable compositions of the present invention can be stabilized against premature polymerization during storage by the addition of conventional polymerization inhibitors, such as hydroquinone, monomethylether of hydroquinone, phenothiazine, di-t-butyl paracresol, and the like. Amounts of 0.1 weight percent or less of the stabilizers are generally effective.

The radiation-curable release compositions of the invention generally are applied to a substrate prior to curing. The compositions may be applied to a substrate as a coating by any conventional means known in the coating art, such as roller coating, curtain coating, brushing, spraying, reverse roll coating, doctor knife, dipping, die coating and the like.

A wide variety of substrates can be coated with the radiation-curable release compositions of the invention. These compositions can be applied to any suitable substrate when it is desirable to modify the release properties of a surface of the substrate. For example, the compositions of the present invention can be employed to form release coatings on substrates, such as paper, vinyl, polyvinyl chloride, and polyester polyolefin films, non-woven fabrics, glass, steel, aluminum, and the like. Included among the types of paper which can be used is clay coated paper, glassinc paper, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, and the like. Examples of papers which can be utilized as substrates in preparing the composite laminates of the present invention include Kraft papers such as 40-pound and 50-pound bleached Kraft papers, 41-pound offset grade bleached Kraft paper, and the like.

The amount of radiation-curable release compositions of the invention applied to the various substrates will vary depending upon the characteristics of the substrate, the properties desired in the release coating, the radiation source utilized, and the particular formulation of the release composition. Generally, it is desired to apply the least amount of coating to obtain the desired result. Thus, applied coating weights may, depending on the substrate and intended use, range from about 0.1 to about 10 or more grams/m².

The release compositions of the present invention can be cured by exposure to known forms of radiation, especially ultraviolet light or ionizing radiation, such as electron beam radiation. One of the advantages of using ultraviolet radiation to effect cure of the composition is that polymerization takes place rapidly at ambient temperature, and heating is not necessary.

Curing of the release compositions of the present invention can be effected in a continuous manner by passing the release-coated substrate through radiation equipment which is designed to provide the coated substrate with sufficient residence time to complete the cure of the coating. Curing is generally to be carried out in the presence of the lowest concentration of oxygen possible, typically at an oxygen concentration of less than 100 ppm, preferably less than 50 ppm. Curing is generally conducted in an inert atmosphere, such as nitrogen or argon. The length of exposure necessary to cure the release compositions of the present invention varies with such factors as the particular formulation used, type and wavelength of radiation, dose rate, energy flux, concentration of photoinitiator (when required), the atmosphere and thickness of the coating. A total dosage of from about 0.2 to 10 megarads, preferably below 4 megarads is sufficient to cure the silicone release compositions by electron beam. For UV cure of the silicone release compositions, a UV dose in the range of from about 0.1 to about 0.5 joules is generally sufficient. The exposure time is generally quite brief and curing is completed in about 0.1 to about 3 seconds. The actual exposure time required to give proper curing for various release compositions can be readily determined by one skilled in the art.

The invention is illustrated by, but not limited to, the following examples.

SYNTHESIS EXAMPLE 1

Preparation of Organopolysiloxane of Formula (I)
wherein n=7 and p=82

(1) Preparation of Me-H Silicone Polymer Component

A mixture of 94.3 g of octamethylcyclotetrasiloxane, 6.7 g of bis-trimethylsilyl methyl-hydrogen polysiloxane of a general composition $MD'_{50}M$, 1.9 of hexamethyidisiloxane and 0.5 g of acid activated calcium-bentonite was stirred and heated at 70° C. under dry nitrogen for six hours. The mixture was allowed to cool to room temperature and then filtered yielding a colorless liquid having a viscosity of 100 cSt at 25° C. and SiH content of 2.9%.

(2) Preparation of Epoxy-Functional Silicone Polymer Component

A mixture of 102.8 g of Me-H silicone polymer [component (1) above], 15.0 g of allyl glycidyl ether and 0.02 g of Karstedt platinum catalyst was stirred at room temperature under dry nitrogen. The self-generated mild exotherm resulted from the hydrosilylation reaction was brought up to 100° C. with heat if necessary. When hydrosilylation reaction was completed, the excess unreacted of allyl glycidyl ether and non-reactive silicone volatiles were stripped at 120° C. using vacuum. The product had an amber color with a viscosity of 240 cSt at 25° C. and epoxy content of 10.5%.

(3) Preparation of Acrylated Functional Silicone Polymer 95.5 g of epoxy-silicone polymer [component (2) above] was dissolved in a stirred mixed solvent composed of 7.5 g of n-butanol and 6.0 g of methyl isobutyl ketone at room temperature. To the stirred solution was added 0.09 g of hydroquinone, 7.0 g of acrylic acid and 0.09 g of chromium acetate catalyst in that order. The mixture was then heated to 110° C. for several hours until all epoxy groups were reacted with acrylic acid. The excess unreacted acrylic acid, along with the solvents, were stripped at 120° C. using vacuum. The final product had green-brownish color with a viscosity of 750 cSt at 25° C. and solid content of 98.5%.

SYNTHESIS EXAMPLE 2

Preparation of Organopolysiloxane of Formula (II)
wherein m=4 and q=220

(a) Preparation of Me-H Silicone Polymer Component

A mixture of 112.2 g of octamethylcyclotetrasiloxane, 1.7 g of bis-trimethylsilyl methyl-hydrogen polysiloxane of a general composition $MD'_{50}M$, 1.1 of hexamethyldisiloxane and 0.5 g of acid activated calcium-bentonite was stirred and heated at 70° C. under dry nitrogen for nine hours. The mixture was then allowed to cool to room temperature and then filtered to yield a clear colorless viscous liquid which was then subjected to stripping at 150° C. using vacuum to remove the unreactive silicone volatiles. The colorless liquid product was found to have a viscosity of 580 cSt at 25° C. and SiH content of 0.66%.

(b) Preparation of Epoxy-Functional Silicone Polymer Component

A mixture of 630.0 g of Me-H silicone polymer [component (a) above], 18.0 g of allyl glycidyl ether and 0.027 g of Karstedt platinum catalyst was stirred at room temperature under dry nitrogen. The self-generated mild exotherm resulted from the hydrosilylation reaction was brought up to 100° C. with heat if necessary. When hydrosilylation reaction was completed, the excess unreacted of allyl glycidyl ether was stripped at 120° C. using vacuum. The product had an amber color with a viscosity of 860 cSt at 25° C. and epoxy content of 2.3%.

(c) Preparation of Acrylated-Functional Silicone Polymer 634.0 g of epoxy-silicone polymer [component (b) above] was dissolved in a stirred mixed solvent composed of 49.0 g of n-butanol and 49.7 g of methyl isobutyl ketone at room temperature. To the stirred solution was added 0.21 g of hydroquinone, 11.2 g of acrylic acid and 0.15 g of chromium acetate catalyst in that order. The mixture was then heated to 110° C. for several hours until all epoxy groups were reacted with acrylic acid. The excess unreacted acrylic acid, along with the solvents, were stripped at 120° C. using vacuum. The final product had green-brownish color with a viscosity of 1070 cSt at 25° C. and solid content of 99.2%.

SYNTHESIS EXAMPLE 3

Preparation of Organopolysiloxane of Formula (III)
wherein r=90

(A) Preparation of Terminal Hydrogen Silicone Polymer Component

A mixture of 811.2 g of octamethylcyclotetrasiloxane, 17.3 g of tetramethyldisiloxane and 6.2 g of acid activated calcium-bentonite was stirred and heated at 70° C. under dry nitrogen for nine hours. The mixture was then allowed to cool to room temperature and then filtered to yield a clear colorless viscous liquid having a viscosity of 89 cSt at 25° C. and SiH content of 0.844%.

(B) Preparation of Terminal Epoxy-Functional Silicone Polymer Component

A mixture of 786.3 g of terminal hydrogen silicone polymer [component (A) above], 30.7 9 of allyl glycidyl ether and 0.36 g of Karstedt platinum catalyst was stirred at room temperature under dry nitrogen. The self-generated mild exotherm resulted from the hydrosilylation reaction was brought up to 80° C. with heat if necessary. When hydrosilylation reaction was completed, the excess unreacted of allyl glycidyl ether and non-reactive silicone volatiles were stripped at 120° C. using vacuum. The product had an amber color with a viscosity of 175 cSt at 25° C. and epoxy content of 3.3%.

(C) Preparation of Terminal Acrylated-Functional Silicone Polymer 709.7 g of terminal epoxy-silicone polymer [component (b) above] was dissolved in a stirred mixed solvent composed of 55.4 g of n-butanol and 42.6 g of methyl isobutyl ketone at room temperature. To the stirred solution was added 0.12 g of hydroquinone, 16.9 g of acrylic acid and 0.54 g of chromium acetate catalyst in that order. The mixture was then heated to 110° C. for several hours until all epoxy groups were reacted with acrylic acid. The excess unreacted acrylic acid, along with the solvents, were stripped at 120° C. using vacuum. The final product had green-brownish color with a viscosity of 235 cSt at 25° C. and solid content of 98.9%.

SYNTHESIS EXAMPLE 4

Preparation of Organopolysiloxane of Formula IV wherein s=3 and t=450

(1) Preparation of Me-H Silicone Polymer Component

A mixture of 1741.1 g of octamethylcyclotetrasiloxane, 9.5 g of bis-trimethylsilyl methyl-hydrogen polysiloxane of a general composition $MD'_{50}M$, 8.2 of hexamethyidisiloxane and 17.5 g of acid activated calcium-bentonite was stirred and heated at 80° C. under dry nitrogen for eleven hours. The mixture was allowed to cool to room temperature and then filtered yielding a colorless liquid having a viscosity of 1880 cSt at 25° C. and SiH content of 0.24%.

(2) Preparation of Epoxy-Functional Silicone Polymer Component

A mixture of 1500.0 g of Me-H silicone polymer [component (1) above], 16.0 g of allyl glycidyl ether and 0.052 g of Karstedt platinum catalyst was stirred at room temperature under dry nitrogen. The self generated mild exotherm resulted from the hydrosilylation reaction was brought up to 85° C. with heat if necessary. When hydrosilylation reaction was completed, the excess unreacted of allyl glycidyl ether and non-reactive silicone volatiles were stripped at 120° C. using vacuum. The final product had an amber color with a viscosity of 3560 cSt at 25° C., solid content of 99.5% and an epoxy level of 0.01%.

(3) Preparation of Acrylated-Functional Silicone Polymer 1328.0 g of epoxy-silicone polymer [component (2) above] was dissolved in a stirred mixed solvent composed of 88.8 g of n-butanol and 72.7 9 of methyl isobutyl ketone at room temperature. To the stirred solution was added 0.12 g of hydroquinone, 8.9 g of acrylic acid and 0.095 g of chromium acetate catalyst in that order. The mixture was then heated to 110° C. for several hours until all epoxy groups were reacted with acrylic acid. The excess unreacted acrylic acid, along with the solvents, were stripped at 120° C. using vacuum. The final product had green-brownish color with a viscosity of 3496 cSt at 25° C. and solid content of 99.2%.

The following are exemplary compositions of this invention and their properties. Formulation and testing was conducted in the following manner. All parts and percentages are by weight unless otherwise specified.

Preparation of Formulation and Coating on Substrate

As a typical example of the preparation of a formulation of this invention, the following exemplifies the preparation of Formulation 5 of the following Table 1. Other formulations are similarly prepared and tested.

To 75 parts of the acrylate-modified polydimethylsiloxane of Synthesis Example 1 are added 25 parts of the acrylate modified polydimethylsiloxane of Synthesis Example 3 and 4.0 parts of the blend a 60/40 weight blend of dipentaerythritol pentaacrylate and 1,6-hexanediol diacrylate.

To this mixture is slowly added under vigorous agitation 3 parts of Esacure® KIP100F photoinitiator. The mixture obtained is kept under agitation for at least 5 minutes. The mixture is then deposited onto the target substrate using an offset gravure coater at a coat weight of about 1.0 to 1.8 g per square meter. The coated paper is then transported under the UV light (or electron beam for examples 13 and 14) at a web speed of 1000 feet per minute.

Testing Protocol

Release Performance

The quality of the coating obtained after curing is evaluated after placing a 1-inch wide acrylate adhesive coated pressure sensitive tape (TESA® 4970 acrylic) in contact with the cured release coating. The laminate is aged for 24 hours under a weighted pressure of 0.25 pounds per square inch at a temperature of 23±2° C.

The release liner is then separated at a peel angle of 180° from the adhesive tape at a rate of 12 in/min and the force required measured and reported in Table 3. To determine the keil-aged properties of the composition, the above tests are repeated 20 hours after contact and at a storage temperature of 70±1° C. under a weighted pressure of 0.25 pounds per square inch. The results are also presented in Table 3.

Rub-Off

The adhesion of the coating onto the substrate is also measured by firmly rubbing in circular patterns one's finger onto the coating. If the coating is not mechanically removed after 5 consecutive circular rubs, the adhesion is considered as excellent and will be attributed a rate of 5. If the coating is removed after 3 circular rubs, a rate of 3 will be attributed, etc.

Loon Tack Migration

This application test allows one to quickly determine the degree of cure of a silicone release coating. It consists in applying an approximately 8-inch long strip of the adhesive tape 610 obtainable from 3M Co. (Saint Paul, Minn.) onto the silicone release coating, pressing the tape with a 2 kg rubber roll 4 times and peeling the adhesive. A loop is then formed by placing the two extremities of the strip in contact so that they overlap over about ½ inch long. The extremities are then pulled away and the uniformity of the force necessary to separate the two adhesive faces is compared with the one of a control sample that would not have been placed in contact with the silicone release coating.

Should a poorly cured silicone release coating contaminate the adhesive, the force that would be required to separate the two faces of the adhesive would be significantly lower than that of a control sample. The sample would be regarded as having failed in the test.

The radiation-curable release composition prepared are set forth in Table 1, the test conditions in Table 2 and the testing results in Table 3.

TABLE 1

| Formulation | Synthesis Example 1 Polymer | Synthesis Example 3 Polymer | Synthesis Example 2 Polymer | Synthesis Example 4 Polymer | Additive * | Photoinitiator (3 parts) |
|---|---|---|---|---|---|---|
| 1 | 100 | — | 10 | — | 3 | Darocur 1173 |
| 2 | 100 | — | — | 5 | — | Darocur 1173 |
| 3 | 100 | — | — | 10 | — | Darocur 1173 |
| 4 | 80 | — | 20 | — | — | Esacure KIP 100F |
| 5 | 75 | — | 25 | — | 4 | Esacure KIP 100F |
| 6 | 90 | 10 | — | — | 1.5 | Esacure KIP 100F |
| 7 | 70 | — | 30 | — | 3 | Esacure KIP 100F |
| 8 | 87.5 | — | 10 | 2.5 | 3 | Esacure KIP 100F |
| 9 | 90 | 10 | — | — | 1.5 | Esacure KIP 100F |
| 10 | 75 | — | 25 | — | 1.5 | — |
| 11 | 100 | — | — | — | — | Esacure KIP 100F |

* 60/40 weight blend of dipentaerythritol pentaacrylate and 1,6-hexanediol diacrylate

TABLE 2

| Example | Formulation | Web speed (ft/min) | UV Power (Watt per in total) | EB Dose (Mrad) | Oxygen content (ppm) | Substrate ** |
|---|---|---|---|---|---|---|
| 1 | 1 | 1000 | 1200 | | 125 | PET |
| 2 | 1 | 1000 | 1200 | | 125 | PEK |
| 3 | 1 | 1000 | 1200 | | 125 | SCK |
| 4 | 2 | 1000 | 1200 | | 120 | PET |
| 5 | 3 | 1000 | 1200 | | 100 | PET |
| 7 | 4 | 1000 | 1200 | | | SCK |
| 8 | 5 | 1000 | 1200 | | | SCK |
| 9 | 6 | 1000 | 1200 | | | SCK |
| 10 | 7 | 1000 | 1200 | | 140 | SCK |
| 11 | 8 | 1000 | 1200 | | 120 | SCK |
| 12 | 9 | 800 | 800 | | <50 | PET |
| 13 | 10 | 1000 | | 2.0 | <50 | PET |
| 14 | 10 | 1000 | | 3.0 | <50 | PET |
| 15 | 11 | 400 | 300 | | 30 | SCK |

** SCK = 42# Super Calendered Kraft paper
PET = Polyester Terephtalate film
PEK = Polyethylene coated Kraft paper

TABLE 3

| Example | Release Value TESA ® 4970 1 day at 23° C. (g/in) | Release Value TESA ® 4970 1 day at 70° C. (g/in) | Rub-Off Test | Loop Tack Migration Test |
|---|---|---|---|---|
| 1 | 7.8 | 11.7 | 4 | Pass |
| 2 | 27.1 | 34.0 | 5 | Pass |
| 3 | 27.3 | 47.0 | 4 | Pass |
| 4 | 7.2 | 11.5 | 4 | Pass |
| 5 | 5.1 | 8.8 | 3 | Fail |
| 7 | 17.4 | 54.0 | 5 | Pass |
| 8 | 18.8 | 44.2 | 5 | Pass |
| 9 | 22.6 | 39.6 | 5 | Pass |
| 10 | 12.0 | 17.8 | 5 | Pass |
| 11 | 17.9 | 26.1 | 5 | Pass |
| 12 | 4.8 | 7.8 | 5 | Pass |
| 13 | 5.8 | 10.3 | 4 | Pass |
| 14 | 7.5 | 12.7 | 3 | Pass |
| 15 | 33.5 | 41.0 | 5 | Pass |

These release formulations provide excellent anchorage on film especially PET, improved polymer compatibility, improved fluid coating and stable release force over extended time periods due to the specific siloxane polymer utilized and the specific combinations thereof.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A radiation-curable release composition comprising:

(a) from about 50 to about 100 parts by weight of an organopolysiloxane of the formula (I)

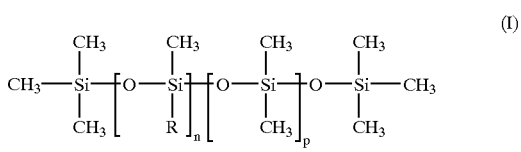

wherein R is $CH_2=CH-C(O)-O-CH_2-CH(OH)-CH_2-O-CH_2-CH_2-CH_2-$, n is 5 to 15, and p is 50 to 150;

(b) from 0 to about 50 parts by weight of one or more organopolysiloxanes comprising organopolysiloxanes selected from the group consisting of those of formulae (II) and (III)

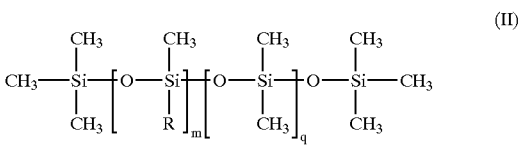

wherein R is $CH_2=CH-C(O)-O-CH_2-CH(OH)-CH_2-O-CH_2-CH_2-CH_2-$, m is 1 to 10, and q is 151 to 300; and

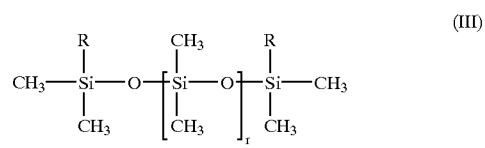

wherein R is $CH_2=CH-C(O)-O-CH_2-CH(OH)-CH_2-O-CH_2-CH_2-CH_2-$, and r is 20 to 500;

(c) from 2.5 to about 10 parts by weight of an organopolysiloxane of formula (IV)

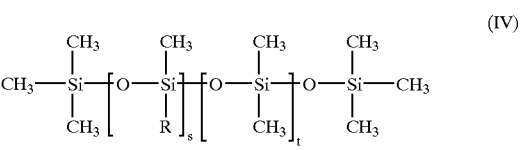

wherein R is $CH_2=CH-C(O)-O-CH_2-CH(OH)-CH_2-O-CH_2-CH_2-CH_2-$, s is 1 to 10, and t is 301 to 1000;

(d) from 0 to about 10 parts by weight of at least one additive for modifying the adhesion and flexibility properties of the composition, the at least one additive selected from the group consisting of acrylate and vinyl ether monomers; and (e) from 0 to about 10 parts by weight of a photoinitiator.

2. A radiation-curable release composition of claim 1 wherein component (b) comprises from about 10 to about 30 weight percent of the composition.

3. A radiation-curable release composition of claim 1 wherein component (d) comprises from about 1.5 to about 4 weight percent of the composition and comprises one or more acrylate monomers.

4. A radiation-curable release composition of claim 2 wherein component (d) comprises from about 1.5 to about 4 weight percent of the composition and comprises one or more acrylate monomers.

5. A radiation-curable release composition according to claim 3 wherein the component (d) comprises a blend of di-pentaerythritol pentacrylate and 1,6-hexanediol diacrylate in a weight ratio of about 60/40.

6. A radiation-curable release composition according to claim 4 wherein the component (d) comprises a blend of di-pentaerythritol pentacrylate and 1,6-hexanediol diacrylate in a weight ratio of about 60/40.

7. A radiation-curable release composition of claim 1 wherein component (e) comprises from about 1 to about 5 weight percent of the composition.

8. A radiation-curable release composition of claim 2 wherein component (e) comprises from about 1 to about 5 weight percent of the composition.

9. A radiation-curable release composition of claim 3 wherein component (e) comprises from about 1 to about 5 weight percent of the composition.

10. A radiation-curable release composition of claim 5 wherein component (e) comprises from about 1 to about 5 weight percent of the composition.

11. A radiation-curable release composition of claim 1 wherein component (b) comprises an organopolysiloxane of formula (II).

12. A radiation-curable release composition of claim 2 wherein component (b) comprises an organopolysiloxane of formula (II).

13. A radiation-curable release composition of claim 1 wherein component (b) comprises an organopolysiloxane of formula (III).

14. A method for producing a release coating on a substrate comprising:

applying a coating of a radiation-curable release composition of claim 1 to a substrate; and curing the coating on the substrate by exposing the coating to radiation.

15. A method for producing a release coating on a substrate comprising:

applying a coating of a radiation-curable release composition of claim 2 to a substrate; and curing the coating on the substrate by exposing the coating to radiation.

16. A method for producing a release coating on a substrate comprising:

applying a coating of a radiation-curable release composition of claim 13 to a substrate; and curing the coating on the substrate by exposing the coating to radiation.

17. The method of claim 14 wherein the radiation is ultraviolet light.

18. The method of claim 15 wherein the radiation is ultraviolet light.

19. The method of claim 16 wherein the radiation is ultraviolet light.

20. A release coated article comprising a substrate which has been coated with a radiation-curable release composition of claim 1 and which has been cured by exposure to radiation.

21. A release coated article comprising a substrate which has been coated with a radiation-curable release composition of claim 2 and which has been cured by exposure to radiation.

22. A release coated article comprising a substrate which has been coated with a radiation-curable release composition of claim 9 and which has been cured by exposure to radiation.

23. A release coated article of claim 20 wherein the substrate is selected from the group consisting of Kraft paper and polyester terephthalate.

24. A release coated article of claim 21 wherein the substrate is selected from the group consisting of Kraft paper and polyester terephthalate.

25. A release coated article of claim 22 wherein the substrate is selected from the group consisting of Kraft paper and polyester terephthalate.

* * * * *